US012606044B2

(12) United States Patent (10) Patent No.: US 12,606,044 B2
Oh et al. (45) Date of Patent: Apr. 21, 2026

(54) UNMANNED DELIVERING ROBOT CAPABLE OF BEING WIRELESSLY CHARGED DURING DELIVERY AND UNMANNED CHARGING DRONE THEREFOR

(71) Applicants: Hyundai Motor Company, Seoul (KR); Kia Corporation, Seoul (KR)

(72) Inventors: Jong Min Oh, Hwaseong-Si (KR); Jong Kyu Choi, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 198 days.

(21) Appl. No.: 18/367,810

(22) Filed: Sep. 13, 2023

(65) Prior Publication Data

US 2024/0317097 A1 Sep. 26, 2024

(30) Foreign Application Priority Data

Mar. 20, 2023 (KR) ........................ 10-2023-0035711

(51) Int. Cl.
*B60L 53/62* (2019.01)
*B60L 53/12* (2019.01)
(Continued)

(52) U.S. Cl.
CPC ............... *B60L 53/62* (2019.02); *B60L 53/12* (2019.02); *B60L 53/38* (2019.02); *B60L 53/57* (2019.02);
(Continued)

(58) Field of Classification Search
CPC ......... B60L 53/62; B60L 53/12; B60L 53/38; B60L 53/57; B60L 53/66;
(Continued)

(56) References Cited

U.S. PATENT DOCUMENTS 5,959,368 A * 9/1999 Kubo ...................... H02J 1/102
307/29
2006/0237158 A1* 10/2006 Shim ..................... A47L 9/2805
134/21
(Continued)

FOREIGN PATENT DOCUMENTS

CN 113984079 A * 1/2022 ......... G01C 21/3469
JP 2019-151149 A 9/2019
(Continued)

OTHER PUBLICATIONS

English Translation of KR-20080070289-A (Year: 2025).*
English Translation of CN-113984079-A (Year: 2025).*
KR101233210B1—English Translation (Year: 2025).*

*Primary Examiner* — Erin M Piateski
*Assistant Examiner* — Eisen Yim
(74) *Attorney, Agent, or Firm* — Banner & Witcoff, Ltd.

(57) ABSTRACT

An unmanned delivery robot capable of being wirelessly charged during delivery, the unmanned delivery robot includes a wireless power reception module, a processor, and a storage medium recording one or more programs configured to be executable by the processor. The processor includes instructions for controlling a communication module to receive a delivery instruction including a delivery route to a destination, controlling a driving module to autonomously travel to the destination according to the delivery route included in the delivery instruction, and controlling the communication module to transmit battery information and location information in real time. The wireless power reception module charges the battery module by wirelessly receiving power from an unmanned charging drone autonomously flying to a current location of the unmanned delivery robot according to a charge instruction including the location information.

20 Claims, 5 Drawing Sheets

(51) Int. Cl.

| | |
|---|---|
| *B60L 53/38* | (2019.01) |
| *B60L 53/57* | (2019.01) |
| *B60L 53/66* | (2019.01) |
| *B64U 10/13* | (2023.01) |
| *B64U 101/25* | (2023.01) |
| *B64U 101/30* | (2023.01) |
| *G01C 21/34* | (2006.01) |
| *G06Q 10/083* | (2024.01) |

(52) U.S. Cl.

CPC .............. *B60L 53/66* (2019.02); *B64U 10/13* (2023.01); *G01C 21/3461* (2013.01); *G06Q 10/083* (2013.01); *B60L 2240/642* (2013.01); *B60L 2240/662* (2013.01); *B60L 2240/70* (2013.01); *B64U 2101/25* (2023.01); *B64U 2101/30* (2023.01); *B64U 2201/10* (2023.01)

(58) Field of Classification Search

CPC ......... B60L 2240/642; B60L 2240/662; B60L 2240/70; B60L 2200/10; B60L 2240/62; B60L 2260/32; B60L 53/68; B60L 58/12; B64U 10/13; B64U 2101/25; B64U 2101/30; B64U 2201/10; B64U 20/87; B64U 50/30; G01C 21/3461; G01C 21/20; G06Q 10/083; B25J 11/008; B25J 5/00; B25J 9/1679; B25J 13/006; B25J 19/005; B64C 39/024; H02J 7/0025; H02J 7/005; H02J 7/00712; H02J 50/10; Y02T 50/60; Y02T 10/70

See application file for complete search history.

(56) References Cited

U.S. PATENT DOCUMENTS

| | | | | |
|---|---|---|---|---|
| 2012/0326724 | A1* | 12/2012 | Park ................... | G01R 31/3648 |
| | | | | 324/426 |
| 2013/0131892 | A1* | 5/2013 | Hashimoto ........ | G01C 21/3469 |
| | | | | 701/1 |
| 2016/0016663 | A1 | 1/2016 | Stanek et al. | |
| 2018/0061148 | A1* | 3/2018 | Dudar ................... | G08G 5/723 |
| 2018/0141453 | A1 | 5/2018 | High et al. | |
| 2019/0025830 | A1* | 1/2019 | O'Brien ................. | B60L 53/36 |
| 2019/0344679 | A1* | 11/2019 | Miller ................... | B64U 70/93 |
| 2020/0009982 | A1 | 1/2020 | Kim | |
| 2020/0191581 | A1 | 6/2020 | Chun | |
| 2020/0333804 | A1* | 10/2020 | Toner ........................ | G08G 5/26 |
| 2021/0078727 | A1* | 3/2021 | Wang ........................ | B64F 1/00 |
| 2021/0132625 | A1 | 5/2021 | Gillett | |
| 2021/0376402 | A1* | 12/2021 | Tsuchiya ................ | B60L 53/66 |
| 2022/0207639 | A1* | 6/2022 | High ........................ | G05D 1/229 |
| 2022/0390245 | A1* | 12/2022 | Konrardy .............. | B60W 30/12 |
| 2022/0393488 | A1* | 12/2022 | Chen ................... | H02M 1/0029 |
| 2024/0010081 | A1* | 1/2024 | Williams .............. | B60L 53/665 |
| 2024/0157828 | A1* | 5/2024 | Ramirez .............. | H02J 7/0047 |
| 2024/0278679 | A1* | 8/2024 | Song ........................ | B60L 53/80 |

FOREIGN PATENT DOCUMENTS

| | | | | | |
|---|---|---|---|---|---|
| KR | 2008070289 | A | * | 7/2008 | |
| KR | 101233210 | B1 | * | 2/2013 | ........... A47L 9/2873 |
| KR | 10-2019-0104477 | A | | 9/2019 | |
| KR | 10-2020-0075330 | A | | 6/2020 | |
| KR | 102365064 | B1 | | 2/2022 | |

* cited by examiner

100

110

130

120

UNMANNED DELIVERING ROBOT CAPABLE OF BEING WIRELESSLY CHARGED DURING DELIVERY AND UNMANNED CHARGING DRONE THEREFOR

CROSS-REFERENCE TO RELATED APPLICATION (S)

This application claims benefit of priority to Korean Patent Application No. 10-2023-0035711 filed on Mar. 20, 2023 in the Korean Intellectual Property Office, the disclosure of which is incorporated herein by reference in its entirety.

BACKGROUND

1. Field

The present disclosure relates to an unmanned delivery robot capable of being wirelessly charged during delivery and an unmanned charging drone therefor.

2. Description of Related Art

In order to provide services, unmanned delivery robots may be put into service without being fully charged due to a large number of delivery requests, or may be discharged during delivery due to unexpected issues. Accordingly, a method is suggested for continuing delivery if the battery thereof is discharged during delivery of goods.

SUMMARY

According to the present disclosure, an unmanned delivery robot may comprise a processor; and a memory storing instructions that, when executed by the processor, cause the unmanned delivery robot to: receive delivery information including a delivery route to a destination; autonomously travel to the destination; transmit battery information and location information in real time; wirelessly receive, based on the battery information and the location information, power from an unmanned charging drone autonomously flying to a current location of the unmanned delivery robot; and charge, based on the wirelessly received power, a battery module.

The battery information may include a remaining battery capacity and a remaining battery lifespan of the battery module; and the remaining battery lifespan may be determined based on a value obtained by dividing the remaining battery capacity by an average load current, the average load current being an average value of load current consumed by the unmanned delivery robot during autonomous travel from a charging station to the current location.

The instructions, when executed by the processor, may further cause the unmanned delivery robot to receive, based on a necessity of charging the battery module, the power, wherein the charge is necessary in one of: a case in which the remaining battery lifespan is less than or equal to remaining delivery time required to reach the destination from the current location; or a case in which the remaining battery capacity is less than or equal to an estimated amount of battery consumption required to reach the destination from the current location.

The remaining delivery time may be determined based on a value obtained by dividing a remaining delivery distance from the current location of the unmanned delivery robot to the destination by a speed of the unmanned delivery robot traveling based on the average load current being applied, and the estimated amount of battery consumption may be determined based on a value obtained by multiplying a sum of amounts of battery consumption considering a slope of a road surface for each of sections of a remaining delivery route from the current location of the unmanned delivery robot to the destination by a factor based on temperature.

The instructions, when executed by the processor, may cause the unmanned delivery robot to: wirelessly receive, based on a charge instruction including an amount of battery charge of the unmanned delivery robot, power corresponding to the amount of battery charge from the unmanned charging drone to charge the battery module; and based on presence or absence of another unmanned delivery robot requiring charging, set the amount of battery charge differently.

The amount of battery charge may include power corresponding to an amount of battery consumption required to autonomously travel to the destination in a case in which the other unmanned delivery robot, requiring charging, is present; and power corresponding to an amount of battery consumption required to autonomously travel from the current location to the destination and power corresponding to an amount of battery consumption required to return to a charging station from the destination in a case in which the other unmanned delivery robot, requiring charging, is absent.

The battery module may include two batteries, during autonomous travel: the two batteries are configured to sequentially supply power to the unmanned delivery robot; and during charging: a battery having a relatively small remaining battery capacity, among the two batteries, is configured to wirelessly receive power from the unmanned charging drone for charging; and the other battery, among the two batteries, is configured to supply power to the unmanned delivery robot.

The instructions, when executed by the processor, may further cause the unmanned delivery robot to acquire route data during autonomous travel, wherein the acquired route data includes: temperature; a slope of a road surface; and an avoidance route caused by an obstacle present on the delivery route. The instructions, when executed by the processor, may further cause the unmanned delivery robot to transmit, based on initiating charging of the battery module, the acquired route data.

The instructions, when executed by the processor, may further cause the unmanned delivery robot to cut off, based on initiating charging of the battery module, power supplied to: a display for displaying a travel state; a GPS for obtaining the location information; and a transceiver.

According to the present disclosure, an unmanned charging drone may comprise a processor; and a memory storing instructions that, when executed by the processor, cause the unmanned charging drone to: receive, based on battery information of an unmanned delivery robot, a charge instruction including location information of the unmanned delivery robot; based on the received charge instruction including the location information of the unmanned delivery robot, autonomously fly to a current location of the unmanned delivery robot; and wirelessly transmit power to the unmanned delivery robot.

The battery information may include a remaining battery capacity and a remaining battery lifespan of a battery module included in the unmanned delivery robot; and the remaining battery lifespan may be determined based on a value obtained by dividing the remaining battery capacity by an average load current, the average load current being an average value of load current consumed by the unmanned delivery robot during autonomous travel from a charging station to the current location.

The instructions, when executed by the processor, may further cause the unmanned charging drone to receive, based on the battery information of the unmanned delivery robot, the charge instruction, wherein charging is necessary in one of: a case in which the remaining battery lifespan is less than or equal to remaining delivery time required to reach a destination from the current location; or a case in which the remaining battery capacity is less than or equal to an estimated amount of battery consumption required to reach the destination from the current location.

The remaining delivery time may be determined based on a value obtained by dividing a remaining delivery distance from the current location of the unmanned delivery robot to the destination by a speed of the unmanned delivery robot traveling based on the average load current being applied, and the estimated amount of battery consumption may be determined based on a value obtained by multiplying a sum of amounts of battery consumption considering a slope of a road surface for each of sections of a remaining delivery route from the current location of the unmanned delivery robot to the destination by a factor based on temperature.

The charge instruction may further include an amount of battery charge of the unmanned delivery robot; and wherein the instructions, when executed by the processor, may cause the unmanned charging drone to: wirelessly transmit power corresponding to the amount of battery charge to the unmanned delivery robot; and based on presence or absence of another unmanned delivery robot requiring charging, set the amount of battery charge differently.

The amount of battery charge may include power corresponding to an amount of battery consumption required to autonomously travel to a destination in a case in which the other unmanned delivery robot, requiring charging, is present; and power corresponding to an amount of battery consumption required to autonomously travel from the current location to the destination and power corresponding to an amount of battery consumption required to return to a charging station from the destination in a case in which the other unmanned delivery robot, requiring charging, is absent.

The unmanned charging drone may further comprise two batteries, wherein: during autonomous travel: the two batteries are configured to sequentially supply power to the unmanned charging drone; and during charging; a battery having a relatively large remaining battery capacity, among the two batteries, is configured to wirelessly transmit power to the unmanned delivery robot; and the other battery, among the two batteries, is configured to supply power to the unmanned charging drone to fly for following the unmanned delivery robot.

The instructions, when executed by the processor, may further cause the unmanned charging drone to fly for following the unmanned delivery robot at a speed synchronized with a speed of the unmanned delivery robot in a state of being spaced apart from the unmanned delivery robot by a predetermined distance in an upward direction.

An upper portion of the unmanned delivery robot may include a marker. The unmanned charging drone may further include a camera capturing, in real time, an image of the upper portion of the unmanned delivery robot including the marker; and wherein the instructions, when executed by the processor, may cause the unmanned charging drone to control the unmanned charging drone to follow the unmanned delivery robot such that the marker is positioned at the center of the captured image of the upper portion of the unmanned delivery robot.

The instructions, when executed by the processor, may further cause the unmanned charging drone to: acquire, based on the unmanned delivery robot being charged, route data instead of the unmanned delivery robot; and transmit the acquired route data including: altitude for obtaining a slope of a road surface; temperature; and route information of the unmanned charging drone, the route information corresponding to an avoidance route caused by an obstacle.

BRIEF DESCRIPTION OF DRAWINGS

The above and other examples, features, and advantages of the present disclosure will be more clearly understood from the following detailed description, taken in conjunction with the accompanying drawings, in which.

DETAILED DESCRIPTION

Figure 1A:
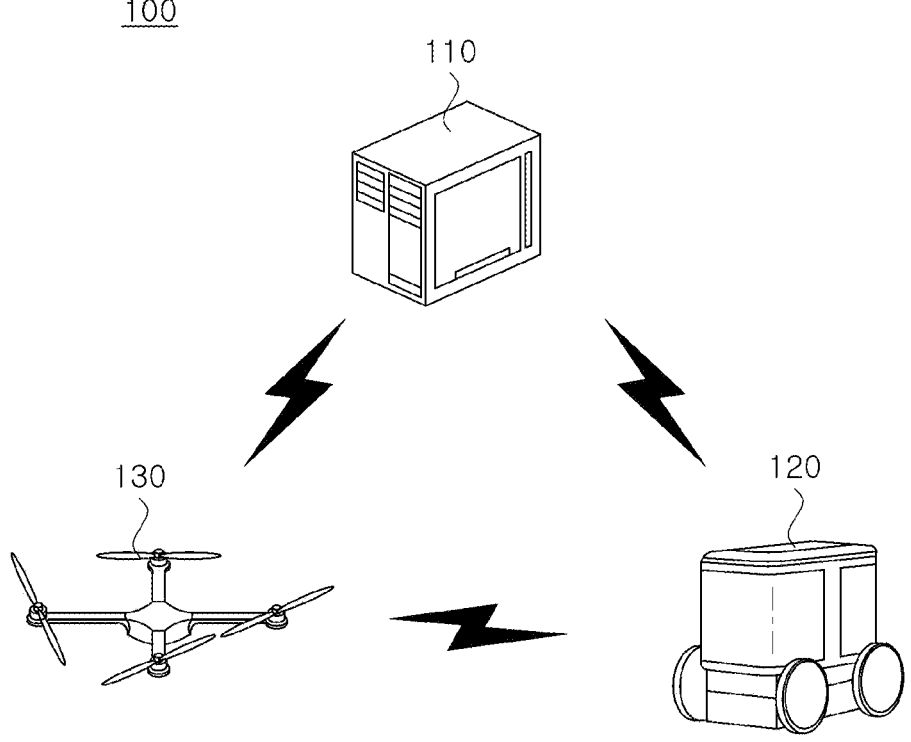
FIG. 1A shows an example of a charging system according to an example of the present disclosure.

Hereinafter, examples of the present disclosure will be described with reference to the accompanying drawings. The present disclosure may, however, be exemplified in many different forms and should not be construed as being limited to the specific examples set forth herein. In addition, examples of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

Figure 1B:
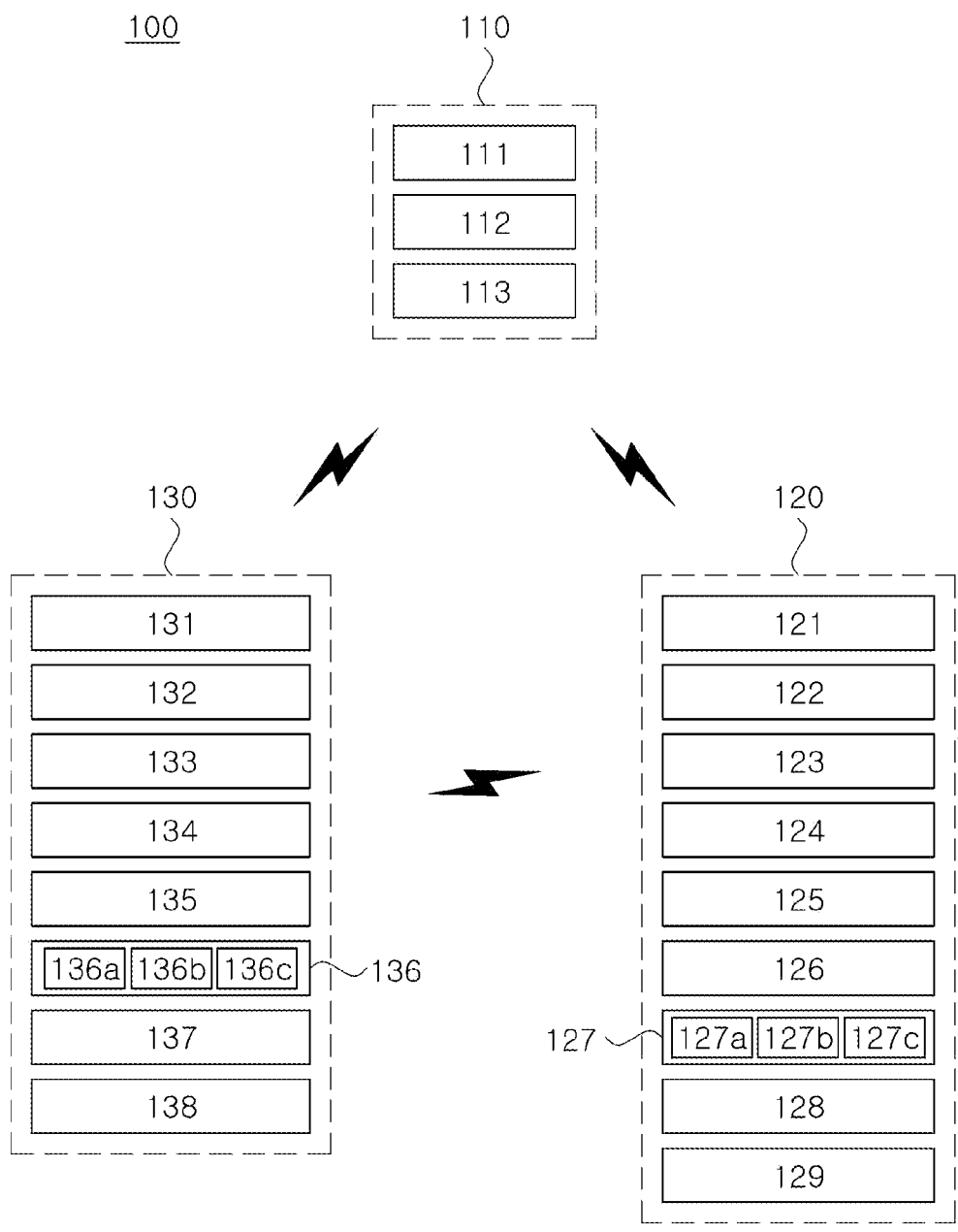
FIG. 1B shows an example of an internal block for each of a control server, an unmanned delivery robot, and an unmanned charging drone.

FIG. 1A shows an example of a charging system. FIG. 1B shows an example of an internal block for each of a control server, an unmanned delivery robot, and an unmanned charging drone.

Hereinafter, a charging system 100 including a control server 110, an unmanned delivery robot 120, and an unmanned charging drone 130 will be described with reference to FIGS. 1A and 1B.

Figure 2:
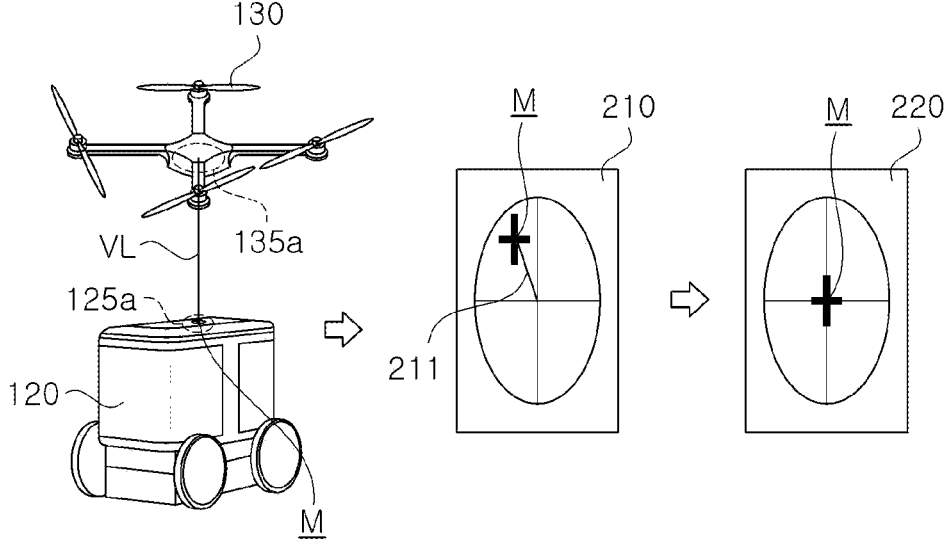
FIG. 2 shows an example of a process of flying while following an unmanned delivery robot based on an upper image of the unmanned delivery robot captured by an unmanned charging drone.

As illustrated in FIGS. 1 and 2, the charging system 100 may include the control server 110, the unmanned delivery robot 120, and the unmanned charging drone 130.

The control server 110 may include a control module 111, a storage module 112, and a communication module 113.

Specifically, the control module 111 may transmit, to the unmanned delivery robot 120, a delivery instruction including a delivery route to a destination, and may receive and monitor battery information and location information of the unmanned delivery robot 120 in real time.

Here, the battery information of the unmanned delivery robot 120 may include a remaining battery capacity and a remaining battery lifespan of the battery module 127 included in the unmanned delivery robot 120.

The above-described remaining battery lifespan may be determined based on a value obtained by dividing the remaining battery capacity (unit: mAh) of the battery module 127 by an average load current (mA), and the average load current may be an average value of load current consumed by the unmanned delivery robot 120 during autonomous travel from a charging station to a current location.

In addition, the control module 111 may determine, based on the battery information of the unmanned delivery robot 120, whether charging is desirable or necessary. If it is determined that charging is desirable or necessary, a charge instruction including the location information of the unmanned delivery robot 120 may be transmitted to the unmanned charging drone 130 in real time.

Specifically, in a case in which the remaining battery lifespan of the battery module 127 included in the unmanned delivery robot 120 is less than or equal to remaining delivery time required to reach the destination from the current location, or a case in which the remaining battery capacity of the battery module 127 is less than or equal to an estimated amount of battery consumption required to reach the destination from the current location, the control module 111 may determine that charging is desirable or necessary.

The above-described remaining delivery time may be determined based on a value obtained by dividing a remaining delivery distance from the current location of the unmanned delivery robot 120 to the destination by a speed of the unmanned delivery robot 120 traveling if the average load current is applied.

In addition, the above-described estimated amount of battery consumption may be, for example, determined based on a value obtained by multiplying a sum of amounts of battery consumption considering a slope of a road surface for each of sections of a remaining delivery route from the current location of the unmanned delivery robot 120 to the destination by a factor according to temperature, as described in Equation 1 below.

$$CT = \sum_{i=1}^{N} (Ci) \times T \qquad \text{[Equation 1]}$$

In Equation 1, CT may represent an estimated amount of battery consumption, Ci may represent an amount of battery consumption considering a slope of a road surface for each of sections of a remaining delivery route, N may represent the number of sections of a remaining delivery route, and T is a factor according to temperature. Accordingly, in a section in which the road surface has a greater slope, the amount of battery consumption Ci may have a greater value. In addition, if the temperature is low, the amount of battery consumption may be greater than usual. The above-described Equation 1 is intended to aid understanding of the present disclosure, and the estimated amount of battery consumption may be obtained in various manners.

The above-described charge instruction may include an amount of battery charge of the unmanned delivery robot 120. In this case, the amount of battery charge may be set differently depending on presence or absence of another unmanned delivery robot requiring charging.

According to an example of the present disclosure, the amount of battery charge may include power corresponding to an amount of battery consumption required for the unmanned delivery robot 120 to autonomously travel to the destination in a case in which the other unmanned delivery robot, requiring charging, is present, and power corresponding to an amount of battery consumption required for the unmanned delivery robot 120 to autonomously travel from the current location to the destination and power corresponding to an amount of battery consumption required to return to a charging station from the destination in a case in which the other unmanned delivery robot, requiring charging, is absent.

In addition, the control module 111 may receive first route data acquired by the unmanned delivery robot 120 and second route data obtained by the unmanned charging drone 130, and may update route data.

Here, the first route data may include temperature, a slope of a road surface, and an avoidance route caused by an obstacle present on a delivery route, and the first route data may be obtained by the unmanned delivery robot 120 until wireless charging of the unmanned delivery robot 120 is initiated.

In addition, the second route data may include temperature, altitude, and route information of the unmanned charging drone 130, and may be acquired by the unmanned charging drone 130. The second route data may be acquired by the unmanned charging drone 130 instead of the unmanned delivery robot 120 while wireless charging of the unmanned delivery robot 120 is performed. The above-described altitude may be used to the slope of the road surface of the first route data, and the above-described route information of the unmanned charging drone 130 may correspond to the avoidance route caused by the obstacle of the first route data.

The storage module 112 may be a module for storing various programs for implementing functions performed by the control module 111 described above. In addition, the storage module 112 may update pre-stored route data based on the above-described first route data and second route data in addition to the above-described route information.

The communication module 113 may be a module for transmitting and receiving various pieces of data between the control server 110, the unmanned delivery robot 120, and the unmanned charging drone 130.

The unmanned delivery robot 120 may be a moving object autonomously travelling on the ground according to a route pre-programmed using a drive device including a wheel or a quadruped while loading goods.

The unmanned delivery robot 120 may include a GPS module 121, a sensing module 122, a driving module 123, a control module 124, a wireless power reception module 125, a display module 126, a battery module 127, a storage module 128, and a communication module 129.

Specifically, the GPS module 121 may obtain location information of the unmanned delivery robot 120 from a GPS signal, and may transmit the obtained location information of the unmanned delivery robot 120 to a control module 134.

The sensing module 122 may be a module for measuring various pieces of data while autonomous travel. The sensing module 122 may include a temperature sensor for measuring temperature, a slope sensor for measuring a slope of a road surface on a delivery route, and an obstacle sensor (for example, a lidar sensor, a laser sensor, an ultrasonic sensor, or the like) for sensing an obstacle present on the delivery route.

The driving module 123 may drive the unmanned delivery robot 120 using power stored in the battery module 127. To this end, the driving module 123 may include a drive motor such as a wheel or a quadruped.

The control module 124 may control the communication module 129 to receive a delivery instruction including a delivery route to a destination, may control the driving module 123 to autonomously travel to the destination according to the delivery route included in the delivery instruction, and may control the communication module 129 to transmit battery information and location information in real time.

In addition, the control module 124 may acquire first route data using the sensing module 122 during autonomous travel. Here, the first route data may include temperature, a slope of a road surface, and an avoidance route caused by an obstacle present on the delivery route, as described above.

In addition, the control module 124 may control the communication module 129 to transmit the acquired first route data to the control server 110 if charging of the unmanned delivery robot 120 is initiated.

In addition, if charging of the unmanned delivery robot 120 is initiated, the control module 124 may cut off power supplied to the display module 126 for displaying a travel state, the GPS module 121 for obtaining location information, and the communication module 129. Conversely, if charging of the unmanned delivery robot 120 is terminated, the control module 124 may supply power to the display module 126, the GPS module 121, and the communication module 129 again.

The wireless power reception module 125 may wirelessly receive power from the unmanned charging drone 130 to charge the battery module 127 to be described below. The wireless power reception module 125 may include a reception coil corresponding to a transmission coil of a wireless power transmission module 135 to be described below.

The display module 126 may display information on the unmanned delivery robot 120, for example, a destination, route information to the destination, delivered goods, and the like.

The battery module 127 may be a module for supplying power to modules of the unmanned delivery robot 120, and various types of batteries such as a lithium-ion battery, an all-solid-state battery, and the like may be used. The above-described battery module 127 may monitor two batteries 127a and 127b and states of the batteries 127a and 127b, and may include a battery management module 127c for obtaining a remaining battery capacity and a remaining battery lifespan of each of the batteries 127a and 127b.

According to an example of the present disclosure, during autonomous travel, the two batteries 127a and 127b may sequentially supply power to the driving module 123. Conversely, during charging, a battery having a relatively low remaining battery capacity, among the two batteries 127a and 127b, may be wirelessly charged by receiving power from the unmanned charging drone, and the other battery, among the two batteries 127a and 127b, may supply power to the driving module 123.

According to an example of the present disclosure, while the unmanned delivery robot is being charged, power supplied to a display module, a GPS module, and a communication module included in the unmanned delivery robot may be cut off, and route data on a remaining route may be measured by the unmanned charging drone, such that power consumed by the unmanned delivery robot may be reduced, thereby rapidly performing charging.

The storage module 128 may be a module for storing various programs for implementing functions performed by the above-described control module 124. In addition, the above-described storage module 128 may store, in advance, an average load current and an amount of battery consumption for each of sections of a delivery route. The average load current and the amount of battery consumption for each of the sections of the delivery route may be used by the battery management module 127c to obtain a remaining battery lifespan and a remaining battery capacity. The above-described remaining battery lifespan may be obtained by, for example, dividing the remaining battery capacity (mAh) by the average load current (mA).

The communication module 129 may be a module for transmitting and receiving various data between the control server 110, the unmanned delivery robot 120, and the unmanned charging drone 130.

The unmanned charging drone 130 may be an air vehicle performing autonomous flight automatically or semi-automatically according to a pre-programmed route without a pilot on board.

The unmanned charging drone 130 may include a GPS module 131, a sensing module 132, a flight module 133, a control module 134, a wireless power transmission module 135, a battery module 136, a storage module 137, and a communication module 138.

The GPS module 131 may obtain location information of the unmanned charging drone 130 from a GPS signal, and may transmit the obtained location information of the unmanned charging drone 130 to the control module 134.

The sensing module 132 may be a module for measuring various pieces of data during autonomous flight. The sensing module 132 may include a temperature sensor for measuring temperature and an altitude sensor for measuring altitude. In addition, the sensing module 132 may further include a camera capturing, in real time, an image of an upper portion of the unmanned delivery robot 120 including a marker, and a distance measurement sensor (for example, a laser sensor, an ultrasonic sensor, or the like) for measuring a distance from the upper portion of the unmanned delivery robot 120.

The flight module 133 may drive the unmanned charging drone 130 to autonomously fly along a preset route using power stored in the battery module. The flight module 133 may include, for example, a propeller and a driving motor.

The control module 134 may control the communication module 138 to receive a charge instruction including location information of the unmanned delivery robot 120, may control, based on the location information of the unmanned delivery robot 120, the flight module 133 to autonomously fly to a current location of the unmanned delivery robot 120 if the charge instruction is received, and may control the wireless power transmission module 135 to wirelessly transmit power to the unmanned delivery robot 120.

The above-described charge instruction may further include an amount of battery charge of the unmanned delivery robot 120. In this case, the control module 134 may control the wireless power transmission module 135 to wirelessly transmit power corresponding to the amount of battery charge to the unmanned delivery robot 120.

In addition, the control module 134 may control the flight module 133 to fly while following the unmanned delivery robot 120 at a speed synchronized with a speed of the unmanned delivery robot 120 in a state of being spaced apart from the unmanned delivery robot 120 by a predetermined distance in an upward direction.

FIG. 2 is a diagram illustrating a process of flying while following an unmanned delivery robot based on an image of an upper portion of the unmanned delivery robot captured by an unmanned charging drone.

As illustrated in FIG. 2, the image of the upper portion of the unmanned delivery robot 120 may include a marker M, and the control module 134 may fly while following the unmanned delivery robot 120 by controlling the flight module 133 to move by an amount of correction 211 such that the marker M is positioned at the center of each of images 210 and 220 of the upper portion captured by the camera of the sensing module 132 in real time.

In addition, the control module 134 may measure a distance from the upper portion of the unmanned delivery robot 120 via the distance measurement sensor of the sensing module 132, and may control the flight module 133 to allow the unmanned charging drone 130 to be spaced apart from the upper portion of the unmanned delivery robot 120 by a predetermined distance.

In addition, the control module 134 may acquire second route data instead of the unmanned delivery robot 120 while charging of the unmanned delivery robot 120 is performed, and may control the communication module to transmit the acquired second route data to the control server 110 if charging of the unmanned delivery robot 120 is completed. The above-described second route data may include temperature, altitude, and route information of the unmanned charging drone 130. The above-described altitude may be used to obtain a slope of a road surface of the first route data, and the above-described route information of the unmanned charging drone 130 may correspond to the avoidance route caused by the obstacle of the first route data, as described above.

In addition, as illustrated in FIG. 2, the unmanned charging drone 130 may include a transmission coil 135a of the wireless power transmission module 135, and the unmanned delivery robot 120 may include a reception coil 125a of the wireless power reception module 125. If the marker M is positioned at the center of the captured image 220 of the upper portion, the transmission coil 135a of the unmanned charging drone 130 and the reception coil 125a of the unmanned delivery robot 120 may be aligned in an upward direction. Here, being aligned means that the center of the transmission coil 135a of the wireless power transmission module 135 and the center of the reception coil 125a of the wireless power reception module 125 are present on a straight line VL in the upward direction. Power transmission efficiency may be increased (e.g., maximized) via such a structure.

The wireless power transmission module 135 may charge the unmanned delivery robot 120 by wirelessly transmitting power stored in a battery module to the unmanned delivery robot 120. The above-described wireless transmission may include, for example, a magnetic induction method or a magnetic resonance method.

The battery module 136 may be a module for supplying power to a module of the unmanned charging drone 130, and various types of batteries such as a lithium-ion battery, an all-solid-state battery, and the like may be used. The above-described battery module 136 may monitor two batteries 136a and 136b and states of the batteries 136a and 136b, and may include a battery management module 136c for obtaining a remaining battery capacity and a remaining battery lifespan.

Specifically, during autonomous flight, the two batteries 136a and 136b may sequentially supply power to the flight module 133. Conversely, during charging, a battery having a relatively large remaining battery capacity, among the two batteries 136a and 136b, may wirelessly transmit power to the unmanned delivery robot 120, and the other battery, among the two batteries 136a and 136b, may supply power to the flight module 133.

The storage module 137 may be a module for storing various programs for implementing functions performed by the above-described control module 124.

The communication module 138 may be a module for transmitting and receiving various pieces of data between the control server 110, the unmanned delivery robot 120, and the unmanned charging drone 130.

As described above, according to an example of the present disclosure, an unmanned delivery robot may autonomously travel to a destination according to a delivery route. If charging is desirable or necessary during delivery, the unmanned delivery robot that is moving may be charged by wirelessly receiving power from an unmanned charging drone autonomously flying to a location of the unmanned delivery robot, thereby resolving issues such as delivery delay and delivery failure due to unexpected discharge.

In addition, according to an example of the present disclosure, while the unmanned delivery robot is being charged, power supplied to a display module, a GPS module, and a communication module included in the unmanned delivery robot may be cut off, and route data on a remaining route may be measured by the unmanned charging drone, such that power consumed by the unmanned delivery robot may be reduced, thereby rapidly performing charging.

In addition, according to an example of the present disclosure, a battery module of the unmanned delivery robot may include two batteries. During charging, a battery having a relatively small remaining battery capacity, among the two batteries, may be wirelessly charged by receiving power from the unmanned charging drone, and the other battery, among the two batteries, may supply power to a driving module, thereby preventing a reduction in efficiency of the battery module caused by charging and discharging being simultaneously performed.

Figure 3:
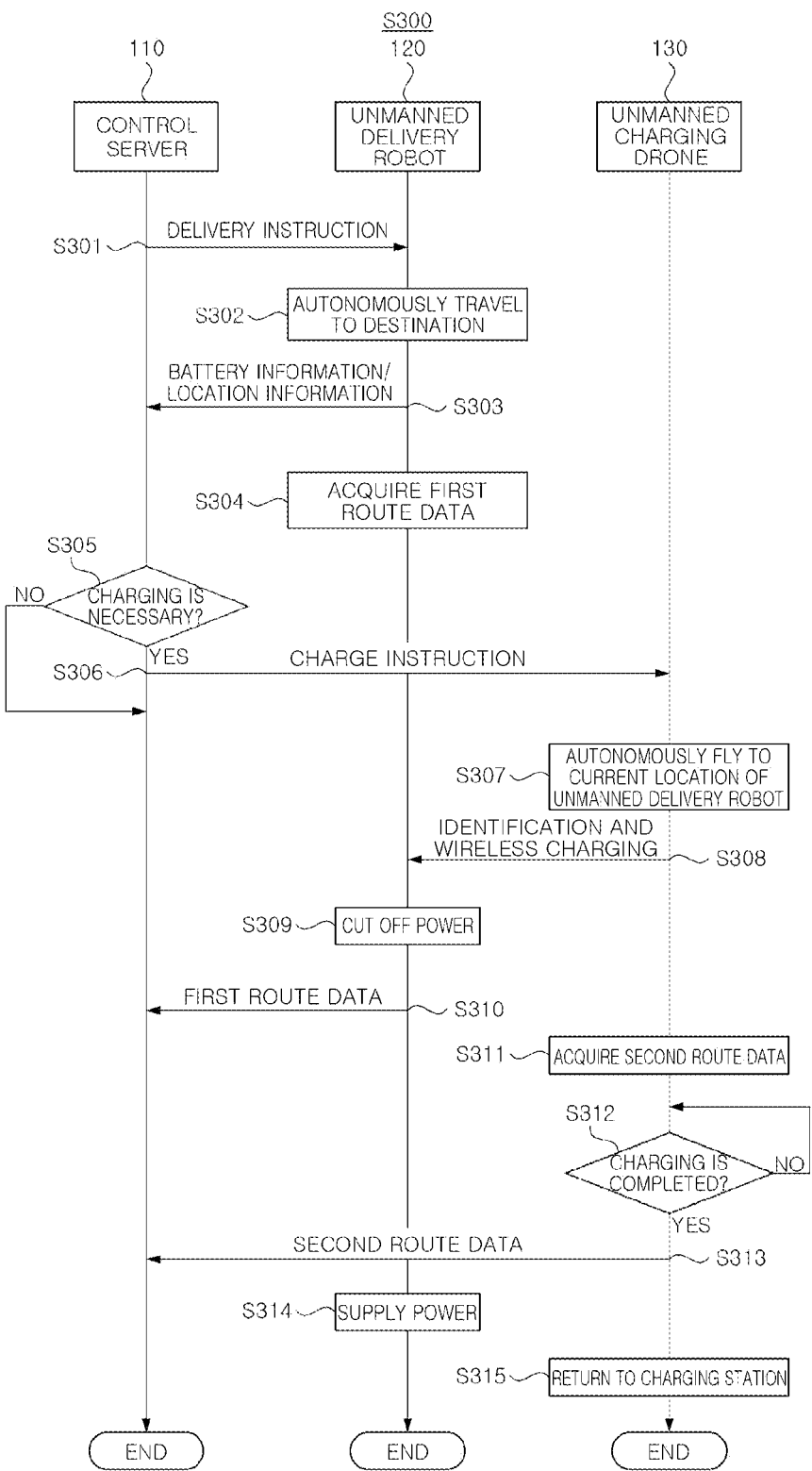
FIG. 3 shows an example of a flowchart showing steps of a wireless charging method for an unmanned delivery robot.

FIG. 3 shows an example of a flowchart showing steps of a wireless charging method for an unmanned delivery robot according to an example of the present disclosure.

Hereinafter, a wireless charging method (S300) for an unmanned delivery robot according to an example of the present disclosure will be described with reference to FIGS. 1 to 3. However, descriptions overlapping those of FIGS. 1 and 2 are omitted for simplicity of the disclosure.

First, the wireless charging method (S300) for an unmanned delivery robot may start with transmitting, by the control server 110, a delivery instruction including a delivery route to a destination to the unmanned delivery robot 120 (S301).

The unmanned delivery robot 120, receiving the delivery instruction, may autonomously travel to the destination according to the delivery route (S302), and may transmit battery information and location information to the control server 110 in real time during autonomous travel (S303).

Here, the battery information may include a remaining battery capacity and a remaining battery lifespan of the unmanned delivery robot 120, and the remaining battery lifespan may be determined based on a value obtained by dividing the remaining battery capacity by an average load current, and the average load current may be an average value of load current consumed by the unmanned delivery robot 120 during autonomous travel from a charging station to a current location, as described above.

In addition, while autonomously travelling, the unmanned delivery robot 120 may acquire first route data (S304). Here, the first route data may include temperature, a slope of a road surface, and an avoidance route caused by an obstacle present on the delivery route, and the first route data may be obtained by the unmanned delivery robot 120 until wireless charging of the unmanned delivery robot 120 is initiated, as described above.

Subsequently, the control server 110 may determine whether charging is desirable or necessary based on the battery information (S305). As a result of the determination, if it is determined that charging is desirable or necessary, a charge instruction including location information of the unmanned delivery robot 120 may be transmitted to the unmanned charging drone 130 in real time (S306).

Specifically, in a case in which the remaining battery lifespan of the battery module 127 included in the unmanned delivery robot 120 is less than or equal to remaining delivery time required to reach the destination from the current location, or a case in which the remaining battery capacity of the battery module 127 is less than or equal to an estimated amount of battery consumption required to reach the destination from the current location, the control server 110 may determine that charging is desirable or necessary.

The above-described remaining delivery time may be determined based on a value obtained by dividing a remaining delivery distance from the current location of the unmanned delivery robot 120 to the destination by a speed of the unmanned delivery robot 120 traveling if the average load current is applied.

In addition, the above-described estimated amount of battery consumption may be, for example, determined based on a value obtained by multiplying a sum of amounts of battery consumption considering a slope of a road surface for each of sections of a remaining delivery route from the current location of the unmanned delivery robot 120 to the destination by a factor according to temperature, as described in Equation 1 below.

The above-described charge instruction may include an amount of battery charge of the unmanned delivery robot 120. In this case, the amount of battery charge may be set differently depending on presence or absence of another unmanned delivery robot requiring charging.

According to an example of the present disclosure, the amount of battery charge may include power corresponding to an amount of battery consumption required for the unmanned delivery robot 120 to autonomously travel to the destination in a case in which the other unmanned delivery robot, requiring charging, is present, and power corresponding to an amount of battery consumption required for the unmanned delivery robot 120 to autonomously travel from the current location to the destination and power corresponding to an amount of battery consumption required to return to a charging station from the destination in a case in which the other unmanned delivery robot, requiring charging, is absent.

The unmanned charging drone 130, receiving the charge instruction, may autonomously fly to the current location of the unmanned delivery robot 120 based on the location information of the unmanned delivery robot 120, and then may wirelessly charge the unmanned delivery robot 120 (S308). In some examples of the present disclosure, the unmanned charging drone 130 may receive identification information (ID) of the unmanned delivery robot 120 via communication with the unmanned delivery robot 120 to identify the unmanned delivery robot 120.

Specifically, the unmanned charging drone 130 may control the flight module 133 to fly while following the unmanned delivery robot 120 at a speed synchronized with a speed of the unmanned delivery robot 120 in a state of being spaced apart from the unmanned delivery robot 120 by a predetermined distance in an upward direction.

That is, as illustrated in FIG. 2, an image of an upper portion of the unmanned delivery robot 120 may include a marker M, and the unmanned charging drone 130 may fly while following the unmanned delivery robot 120 by controlling the flight module 133 to move by an amount of correction 211 such that the marker M is positioned at the center of each of images 210 and 220 of the upper portion captured by a camera in real time.

In addition, the control module 134 may measure a distance from the upper portion of the unmanned delivery robot 120 via a distance measurement sensor of the sensing module 132, and may control the flight module 133 to allow the unmanned charging drone 130 to be spaced apart from the upper portion of the unmanned delivery robot 120 by a predetermined distance.

In addition, as illustrated in FIG. 2, the unmanned charging drone 130 may include a transmission coil 135a, and the unmanned delivery robot 120 may include a reception coil 125a. If the marker M is positioned at the center of the captured image 220 of the upper portion, the transmission coil 135a of the unmanned charging drone 130 and the reception coil 125a of the unmanned delivery robot 120 may be aligned in an upward direction, as described above.

If charging is initiated, the unmanned delivery robot 120 may cut off power supplied to the display module 126 for displaying a travel state, the GPS module 121 for receiving location information, and the communication module 129. (S309).

Thereafter, the unmanned delivery robot 120 may transmit the acquired first route data to the control server 110 (S310), and the unmanned charging drone 130 may acquire second route data instead of the unmanned delivery robot 120 while charging of the unmanned delivery robot 120 is performed (S311).

Here, the first route data may include temperature, a slope of a road surface, and an avoidance route caused by an obstacle present on the delivery route, and the second route data may include altitude for obtaining the slope of the road surface, temperature, and route information of the unmanned charging drone 130. The route information of the unmanned charging drone 130 may correspond to the avoidance route caused by the obstacle, as described above.

Thereafter, the unmanned charging drone 130 may determine whether charging is completed (S312). If charging is completed, the unmanned charging drone 130 may transmit the acquired second route data to the control server 110 (S313), and then may return to the charging station (S315).

If charging is completed, the unmanned delivery robot 120 may supply power to the display module 126, the GPS module 121, and the communication module 129 again (S314).

As described above, according to an example of the present disclosure, an unmanned delivery robot may autonomously travel to a destination according to a delivery route. If charging is desirable or necessary during delivery, the unmanned delivery robot that is moving may be charged by wirelessly receiving power from an unmanned charging drone autonomously flying to a location of the unmanned delivery robot, thereby resolving issues such as delivery delay and delivery failure due to unexpected discharge.

In addition, according to an example of the present disclosure, while the unmanned delivery robot is being charged, power supplied to a display module, a GPS module, and a communication module included in the unmanned delivery robot may be cut off, and route data on a remaining route may be measured by the unmanned charging drone, such that power consumed by the unmanned delivery robot may be reduced, thereby rapidly performing charging.

In addition, according to an example of the present disclosure, a battery module of the unmanned delivery robot may include two batteries. During charging, a battery having a relatively small remaining battery capacity, among the two batteries, may be wirelessly charged by receiving power from the unmanned charging drone, and the other battery, among the two batteries, may supply power to a driving module, thereby preventing a reduction in efficiency of the battery module caused by charging and discharging being simultaneously performed.

Figure 4:
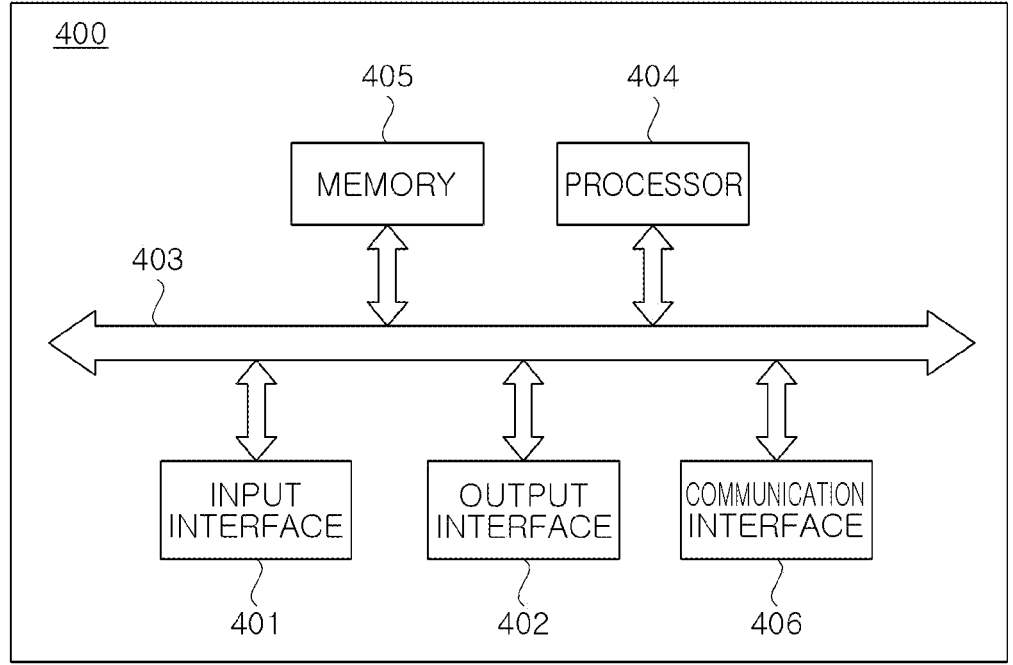
FIG. 4 shows an example of a block diagram of a computer device capable of fully or partially implementing a control server, an unmanned delivery robot, and an unmanned charging drone.

FIG. 4 shows an example of a block diagram for a computer device capable of fully or partially implementing a control server, an unmanned delivery robot, and an unmanned charging drone according to an example of the present disclosure, and may be applied to the control server 110, the unmanned delivery robot 120, and the unmanned charging drone 130 illustrated in FIG. 1B.

As illustrated in FIG. 4, a computer device 400 may include an input interface 401, an output interface 402, a processor 404, a memory 405, and a communication interface 406, and the input interface 401, the output interface 402, the processor 404, the memory 405, and the communication interface 406 may be interconnected via a system bus 403.

The communication interface 406 may be connected to a network via wireless or wired communication, and thus may communicate with an external device. The wireless communication may include, for example, cellular communication using at least one of LTE, LTE advance (LTE-A), code division multiple access (CDMA), wideband CDMA (WCDMA), a universal mobile telecommunications system (UMTS), wireless broadband (WiBro), or a global system for mobile communication (GSM). According to an example, the wireless communication may include, for example, at least one of wireless fidelity (WiFi), Bluetooth, Bluetooth low energy (BLE), Zigbee, near field communication (NFC), magnetic secure transmission, radio frequency (RF), or a body area network (BAN). According to an example, the wireless communication may include GNSS. The GNSS may be, for example, GPS, the global navigation satellite system (Glonass), the Beidou navigation satellite system (hereinafter "Beidou"), or Galileo, the European global satellite-based navigation system. The wired communication may include, for example, at least one of a universal serial bus (USB), a high-definition multimedia interface (HDMI), recommended standard 232 (RS-232), power line communication, or a plain old telephone service (POTS). The network may include at least one of a telecommunications network, for example, a computer network (for example, LAN or WAN), the Internet, or a cellular network.

In an example of the present disclosure, the memory 405 may be used to store programs, instructions or codes, and the processor 404 may execute the programs, instructions or codes stored in the memory 405, and may control the input interface 401 to receive signals and control the output interface 402 to transmit signals. The above-described memory 405 may include read-only memory and random-access memory, and may provide instructions and data to the processor 404. The communication interface 406 may implement the communication modules 129 and 138.

In an example of the present disclosure, the processor 404 may be a central processing unit (CPU), and may be understood as being another general-purpose processor, a digital signal processor (DSP), an application specific integrated circuit (ASIC), a field programmable gate array (FPGA) or another programmable logic device, an individual gate or transistor logic device, an individual hardware component, or the like. The general-purpose processor may be a microprocessor, or the processor may be processor according to the related art or the like. The above-described processor 404 may perform an operation of a test charge/discharge control device based on the above-described V2G technology.

In an implementation, the method of FIG. 3 may be accomplished by an integrated logic circuit of hardware in the processor 404 or an instruction in the form of software (e.g., instructions stored in a non-transitory computer readable medium). The method disclosed with respect to examples of the present disclosure may be performed and completed by a hardware processor, or may be performed and completed by a combination of hardware in the processor and a software module. The software module may be disposed in a storage medium such as random-access memory, flash memory, read-only memory, programmable read-only memory, or electrically erasable programmable memory, a register, or the like. The storage medium may be positioned in the memory 405. The processor 404 may read information on the memory 405, and may implement the above-described method in combination with hardware. In order to avoid redundancy, a detailed description will be omitted herein.

In the present disclosure, " . . . unit" may be implemented in various manners, for example, by a processor, program instructions executed by the processor, a software module, a microcode, a computer program product, a logic circuit, an application-specific integrated circuit, firmware, or the like, or may be implemented by hardware.

An example of the present disclosure provides an unmanned delivery robot capable of being wirelessly charged during delivery and an unmanned charging drone therefor. An unmanned delivery robot that is moving may be charged if charging is desirable or necessary during delivery, thereby resolving issues such as delivery delay and delivery failure due to unexpected discharge.

Another example of the present disclosure provides an unmanned delivery robot capable of being wirelessly charged during delivery and an unmanned charging drone therefor. The unmanned delivery robot may be rapidly charged by reducing power consumed by the unmanned delivery robot.

Another example of the present disclosure provides an unmanned delivery robot capable of being wirelessly charged during delivery and an unmanned charging drone therefor. The unmanned delivery robot may prevent a reduction in efficiency of a battery module caused by charging and discharging being simultaneously performed.

According to an example of the present disclosure, there is provided an unmanned delivery robot capable of being wirelessly charged during delivery, the unmanned delivery robot including a communication module, a battery module, a driving module driving the unmanned delivery robot using power stored in the battery module, a wireless power reception module receiving power to charge the battery module, a processor, and a storage medium recording one or more programs configured to be executable by the processor. The processor may include instructions for controlling the communication module to receive a delivery instruction including a delivery route to a destination, controlling the driving module to autonomously travel to the destination according to the delivery route included in the delivery instruction, and controlling the communication module to transmit battery information and location information in real time. The wireless power reception module may charge the battery module by wirelessly receiving power from an unmanned charging drone autonomously flying to a current location of the unmanned delivery robot according to a charge instruction including the location information, the charge instruction being transmitted to the unmanned charging drone in a case in which charging is desirable or necessary, based on the battery information.

According to another example of the present disclosure, there is provided an unmanned charging drone for an unmanned delivery robot, the unmanned charging drone including a communication module, a battery module, a flight module driving the unmanned charging drone using power stored in the battery module, a wireless power transmission module wirelessly transmitting power stored in the battery module to the unmanned delivery robot, a processor, and a storage recording one or more programs configured to be medium executable by the processor. The processor may include instructions for controlling the communication module to receive a charge instruction including location information of the unmanned delivery robot, the charge instruction being transmitted to the unmanned charging drone if charging is desirable or necessary based on battery information of the unmanned delivery robot, controlling, based on the location information of the unmanned delivery robot, the flight module to autonomously fly to a current location of the unmanned delivery robot, if the charge instruction is received, and then controlling the wireless power transmission module to wirelessly transmit power to the unmanned delivery robot.

According to an example of the present disclosure, an unmanned delivery robot may autonomously travel to a destination according to a delivery route. If charging is desirable or necessary during delivery, the unmanned delivery robot that is moving may be charged by wirelessly receiving power from an unmanned charging drone autonomously flying to a location of the unmanned delivery robot, thereby resolving issues such as delivery delay and delivery failure due to unexpected discharge.

In addition, according to an example of the present disclosure, while the unmanned delivery robot is being charged, power supplied to a display module, a global positioning system (GPS) module, and a communication module included in the unmanned delivery robot may be cut off, and route data on a remaining route may be measured by the unmanned charging drone, such that power consumed by the unmanned delivery robot may be reduced, thereby rapidly performing charging.

In addition, according to an example of the present disclosure, a battery module of the unmanned delivery robot may include two batteries. During charging, a battery having a relatively small remaining battery capacity, among the two batteries, may be wirelessly charged by receiving power from the unmanned charging drone, and the other battery, among the two batteries, may supply power to a driving module, thereby preventing a reduction in efficiency of the battery module caused by charging and discharging being simultaneously performed.

While the present disclosure has been illustrated and described above, it will be apparent to those skilled in the art that modifications and variations could be made without departing from the scope of the present disclosure as defined by the appended claims.

What is claimed is:
1. An unmanned delivery robot comprising:
a processor; and
a memory storing instructions that, when executed by the processor, cause the unmanned delivery robot to:
    receive delivery information including a delivery route to a destination;
    autonomously travel, based on the delivery route, to the destination;
    transmit battery information and location information in real time;
    wirelessly receive, based on the battery information and the location information, power from an unmanned charging drone autonomously flying to a current location of the unmanned delivery robot; and
    charge, based on the wirelessly received power, a battery module,
    wherein the battery module includes at least two batteries, and
    wherein based on a first battery of the at least two batteries having a lower remaining battery capacity than a second battery of the at least two batteries:
        the first battery is configured to wirelessly receive power from the unmanned charging drone for charging; and
        the second battery is configured to supply power to the unmanned delivery robot.

2. The unmanned delivery robot of claim 1, wherein
the battery information includes a remaining battery capacity and a remaining battery lifespan of the battery module; and
the remaining battery lifespan is determined based on a value obtained by dividing the remaining battery capacity by an average load current, the average load current being an average value of load current consumed by the unmanned delivery robot during autonomous travel from a charging station to the current location.

3. The unmanned delivery robot of claim 2, wherein the instructions, when executed by the processor, further cause the unmanned delivery robot to receive, based on a necessity of charging the battery module, the power, wherein the charge is necessary in one of:
a case in which the remaining battery lifespan is less than or equal to remaining delivery time required to reach the destination from the current location; or
a case in which the remaining battery capacity is less than or equal to an estimated amount of battery consumption required to reach the destination from the current location.

4. The unmanned delivery robot of claim 3, wherein
the remaining delivery time is determined based on a value obtained by dividing a remaining delivery distance from the current location of the unmanned delivery robot to the destination by an average speed of the unmanned delivery robot, and
the estimated amount of battery consumption is determined based on a value obtained by multiplying a sum of amounts of battery consumption considering a slope of a road surface for each of sections of a remaining delivery route from the current location of the unmanned delivery robot to the destination by a factor based on temperature.

5. The unmanned delivery robot of claim 1, wherein the instructions, when executed by the processor, cause the unmanned delivery robot to:
wirelessly receive, based on a charge instruction including an amount of battery charge of the unmanned delivery robot, power corresponding to the amount of battery charge from the unmanned charging drone to charge the battery module; and based on presence or absence of another unmanned delivery robot requiring charging, set the amount of battery charge differently.

6. The unmanned delivery robot of claim 5, wherein the amount of battery charge includes:

power corresponding to an amount of battery consumption required to autonomously travel to the destination in a case in which the other unmanned delivery robot, requiring charging, is present; and power corresponding to an amount of battery consumption required to autonomously travel from the current location to the destination and power corresponding to an amount of battery consumption required to return to a charging station from the destination in a case in which the other unmanned delivery robot, requiring charging, is absent.

7. The unmanned delivery robot of claim 1, wherein, during autonomous travel:

the at least two batteries are configured to sequentially supply power to the unmanned delivery robot; and during charging:

the first battery, among the at least two batteries, is configured to wirelessly receive, based on the first battery having a lower remaining battery capacity than the second battery, power from the unmanned charging drone for charging; and the second battery is configured to supply, based on the first battery having a lower remaining battery capacity than the second battery, power to the unmanned delivery robot.

8. The unmanned delivery robot of claim 1, wherein the instructions, when executed by the processor, further cause the unmanned delivery robot to acquire route data during autonomous travel, wherein the acquired route data includes:

temperature;

a slope of a road surface; and an avoidance route caused by an obstacle present on the delivery route.

9. The unmanned delivery robot of claim 8, wherein the instructions, when executed by the processor, further cause the unmanned delivery robot to transmit, based on initiating charging of the battery module, the acquired route data.

10. The unmanned delivery robot of claim 9, wherein the instructions, when executed by the processor, further cause the unmanned delivery robot to cut off, based on initiating charging of the battery module, power supplied to:

a display for displaying a travel state;

a Global Positioning System (GPS) for obtaining the location information; and a transceiver.

11. An unmanned charging drone comprising:

at least two batteries;

a processor; and a memory storing instructions that, when executed by the processor, cause the unmanned charging drone to:

receive, based on battery information of an unmanned delivery robot, a charge instruction including location information of the unmanned delivery robot;

based on the received charge instruction including the location information of the unmanned delivery robot, autonomously fly to a current location of the unmanned delivery robot; and wirelessly transmit power to the unmanned delivery robot, wherein based on a first battery of the at least two batteries having a greater remaining battery capacity than a second battery of the at least two batteries:

the first battery is configured to wirelessly transmit power to the unmanned delivery robot; and the second battery is configured to supply power to the unmanned charging drone to fly for following the unmanned delivery robot.

12. The unmanned charging drone of claim 11, wherein the battery information includes a remaining battery capacity and a remaining battery lifespan of a battery included in the unmanned delivery robot; and the remaining battery lifespan is determined based on a value obtained by dividing the remaining battery capacity by an average load current, the average load current being an average value of load current consumed by the unmanned delivery robot during autonomous travel from a charging station to the current location.

13. The unmanned charging drone of claim 12, wherein the instructions, when executed by the processor, further cause the unmanned charging drone to receive, based on the battery information of the unmanned delivery robot, the charge instruction, wherein charging is necessary in one of:

a case in which the remaining battery lifespan is less than or equal to remaining delivery time required to reach a destination from the current location; or a case in which the remaining battery capacity is less than or equal to an estimated amount of battery consumption required to reach the destination from the current location.

14. The unmanned charging drone of claim 13, wherein the remaining delivery time is determined based on a value obtained by dividing a remaining delivery distance from the current location of the unmanned delivery robot to the destination by an average speed of the unmanned delivery robot, and the estimated amount of battery consumption is determined based on a value obtained by multiplying a sum of amounts of battery consumption considering a slope of a road surface for each of sections of a remaining delivery route from the current location of the unmanned delivery robot to the destination by a factor based on temperature.

15. The unmanned charging drone of claim 11, wherein the charge instruction further includes an amount of battery charge of the unmanned delivery robot; and wherein the instructions, when executed by the processor, cause the unmanned charging drone to:

wirelessly transmit power corresponding to the amount of battery charge to the unmanned delivery robot; and based on presence or absence of another unmanned delivery robot requiring charging, set the amount of battery charge differently.

16. The unmanned charging drone of claim 15, wherein the amount of battery charge includes:

power corresponding to an amount of battery consumption required to autonomously travel to a destination in a case in which the other unmanned delivery robot, requiring charging, is present; and power corresponding to an amount of battery consumption required to autonomously travel from the current location to the destination and power corresponding to an amount of battery consumption required to return to a charging station from the destination in a case in which the other unmanned delivery robot, requiring charging, is absent.

17. The unmanned charging drone of claim 11, wherein:

during autonomous travel:

the at least two batteries are configured to sequentially supply power to the unmanned charging drone; and during charging:

the first battery, is configured to wirelessly transmit, based on the first battery having a greater remaining battery capacity than the second battery, power to the unmanned delivery robot; and the second battery is configured to supply, based on the first battery having a greater remaining battery capacity than the second battery, power to the unmanned charging drone to fly for following the unmanned delivery robot.

18. The unmanned charging drone of claim 17, wherein the instructions, when executed by the processor, further cause the unmanned charging drone to fly for following the unmanned delivery robot at a speed synchronized with a speed of the unmanned delivery robot in a state of being spaced apart from the unmanned delivery robot by a predetermined distance in an upward direction.

19. The unmanned charging drone of claim 17, wherein an upper portion of the unmanned delivery robot includes a marker;

the unmanned charging drone further includes a camera capturing, in real time, an image of the upper portion of the unmanned delivery robot including the marker; and wherein the instructions, when executed by the processor, cause the unmanned charging drone to control the unmanned charging drone to follow the unmanned delivery robot such that the marker is positioned at the center of the captured image of the upper portion of the unmanned delivery robot.

20. The unmanned charging drone of claim 11, wherein the instructions, when executed by the processor, further cause the unmanned charging drone to:

acquire, based on the unmanned delivery robot being charged, route data instead of the unmanned delivery robot; and transmit the acquired route data including:

altitude for obtaining a slope of a road surface;

temperature; and route information of the unmanned charging drone, the route information corresponding to an avoidance route caused by an obstacle.

\* \* \* \* \*